G. W. HINKLE.
Hold-Back for Vehicles.

No. 225,603. Patented Mar. 16, 1880.

Witnesses:
W. W. Mortimer
Will. H. Kern

Inventor:
Geo. W. Hinkle,
per
F. A. Lehmann,
Atty

UNITED STATES PATENT OFFICE.

GEORGE W. HINKLE, OF MENDON, MICHIGAN.

HOLDBACK FOR VEHICLES.

SPECIFICATION forming part of Letters Patent No. 225,603, dated March 16, 1880.

Application filed February 3, 1880.

*To all whom it may concern:*

Be it known that I, GEORGE W. HINKLE, of Mendon, in the county of St. Joseph and State of Michigan, have invented certain new and useful Improvements in Holdbacks; and I do hereby declare the following to be a full, clear, and exact description of the invention, such as will enable others skilled in the art to which it pertains to make and use it, reference being had to the accompanying drawings, which form part of this specification.

My invention relates to an improvement in holdbacks; and it consist, first, in securing the pin which prevents the ring or holdback-strap from coming out of the hook in a piece of rubber, whereby it can be moved back and forth as upon a pivot.

It further consists in the manner of attaching the hook to the thill, as will be more fully described hereinafter.

Figure 1:
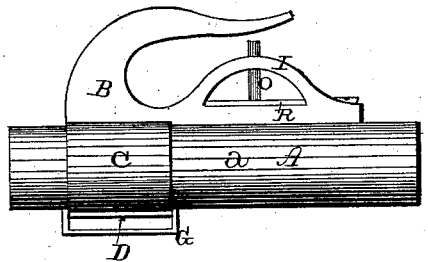
Figure 2:
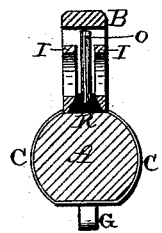

Figure 1 is a side elevation of my invention. Fig. 2 is a vertical cross-section of the same.

A represents the shaft, and B the holdback-hook. This hook may be made either of the shape herein shown or in any other that may be preferred, and is secured to the shaft at its front end by means of a screw or other similar fastening device, and at its rear end by means of the band C, which passes around the shaft, and has its two perforated ends made to catch over a stud or projection, D, which extends out from the shaft. After these two ends have been fastened over this stud or projection, a staple or U-shaped fastening, G, is made to straddle over the two ends, and is driven into the shaft, so as to prevent the ends from coming off the stud or projection, over which they catch.

On the inner side of that part of the hook which extends along the shaft are formed the two guides I, which are raised up a suitable distance, as shown, for the purpose of keeping the pin O from becoming displaced laterally. The lower end of this pin O is secured in a block of rubber, R, which is inserted in an opening in the lower part of the hook, and which rubber allows the pin to be moved back and forth within the guides for the purpose of allowing the ring connected to the holdback-strap, or the holdback-strap itself, to be passed freely in and out of the hook. The rubber keeps the pin in a vertical position between the two guides, so that it will prevent either the strap or the ring from coming out of the hook except when a decided pull is made forward, and thus the holdback-strap can never accidentally become disengaged from the hook.

By using a block of rubber a very strong and effective spring is produced, and one which is much cheaper than the metallic spring employed for this purpose.

Having thus described my invention, I claim—

1. The combination of a holdback-hook with a block of rubber, having a pin, O, embedded therein, substantially as described.

2. A holdback-hook in combination with a block of rubber having a pin inserted therein and two guides formed upon the hook to prevent the pin from being moved laterally, substantially as shown.

3. The combination of a holdback-hook with a metallic strap for fastening it to the shaft, a stud or projection for the ends of the strap to catch over, and a staple or U-shaped fastening for catching over the ends of the strap, substantially as set forth.

In testimony that I claim the foregoing I have hereunto set my hand this 27th day of January, 1880.

GEORGE W. HINKLE.

Witnesses:
 LEONIDAS G. WOOLLEY,
 CHAS. H. LEWIS.